(12) United States Patent
Gilli

(10) Patent No.: US 6,559,414 B2
(45) Date of Patent: May 6, 2003

(54) OPERATING HEAD, SPECIFICALLY FOR A LASER MACHINE

(75) Inventor: Luigi Gilli, Luserna San Giovanni (IT)

(73) Assignee: Prima Industrie SpA, Collegno (IT)

(*) Notice: Subject to any disclaimer, the term of this patent is extended or adjusted under 35 U.S.C. 154(b) by 25 days.

(21) Appl. No.: 09/809,751

(22) Filed: Mar. 16, 2001

(65) Prior Publication Data
US 2001/0022297 A1 Sep. 20, 2001

(30) Foreign Application Priority Data
Mar. 17, 2000 (IT) ..................... TO2000A0252

(51) Int. Cl.[7] .................... B23K 26/02; B23K 26/08
(52) U.S. Cl. ................................. 219/121.78
(58) Field of Search ............... 219/121.78, 121.79, 219/121.82

(56) References Cited

U.S. PATENT DOCUMENTS

| 4,458,168 A | 7/1984 | Welburn |
| 4,710,606 A | 12/1987 | Soroka et al. |
| 4,884,941 A | 12/1989 | Kazerooni |
| 5,231,264 A | 7/1993 | Fujita |

FOREIGN PATENT DOCUMENTS

| EP | 0 331 914 A2 | 9/1989 |
| EP | 0 416 112 A1 | 3/1991 |
| EP | 0 472 378 A2 | 2/1992 |
| EP | 0 927 596 A2 | 7/1999 |

*Primary Examiner*—M. Alexandra Elve
(74) *Attorney, Agent, or Firm*—Traskbritt

(57) ABSTRACT

Operating head, specifically for laser machine, comprising: a base (12), a rotary body (20) fitted on the base (12) so to turn on an axis (B), a terminal body (30) mobile with respect to the rotary body (20) in the direction of said axis (B), a first motor (36) for controlling the movement of the rotary body (20) on said axis (B) and a second motor (42) for controlling the movement of the terminal body (30) on said axis (B). The first motor (36) and the second motor (42) are direct motors.

6 Claims, 3 Drawing Sheets

OPERATING HEAD, SPECIFICALLY FOR A LASER MACHINE

BACKGROUND OF THE INVENTION

This invention relates to an operating head, specifically for a laser machine. An operating head which characteristics are described in the preamble of the main claim is illustrated in document EP927596 by the Applicant. This known head comprises a stand carrying a first mirror suitable for receiving a laser beam along a first axis and deflecting it along a second axis. A rotary body is fitted on the base so that it can turn on the second axis and bears a terminal body which is mobile with respect to the rotary body in the direction of the second axis. A first motor fitted on the base turns the rotary body by means of a transmission mechanism which comprises a pair of bevel gears. A second motor is connected to the terminal body and controls the movement of said terminal body by means of a gear which is connected to the motor by means of a belt and which co-operates with a stationary rack.

A head of the type described above permits movement of the laser beam at high speed on two-dimensional, small sized paths without moving the main axes of the machine.

Purpose of this invention is to perfect an operating head of the type specified above, to increase accuracy in movements, reduce the number of components and realise a head which is more simple and compact and which presents a lower inertia of mobile parts.

According to this invention, this purpose is reached by means of a method which characteristics are described in the main claim.

DESCRIPTION OF THE SEVERAL VIEWS OF THE DRAWINGS

This invention will be better explained by the following detailed descriptions with reference to the accompanying figure as non-limiting example, whereas.

DETAILED DESCRIPTION OF THE INVENTION

Figure 1:
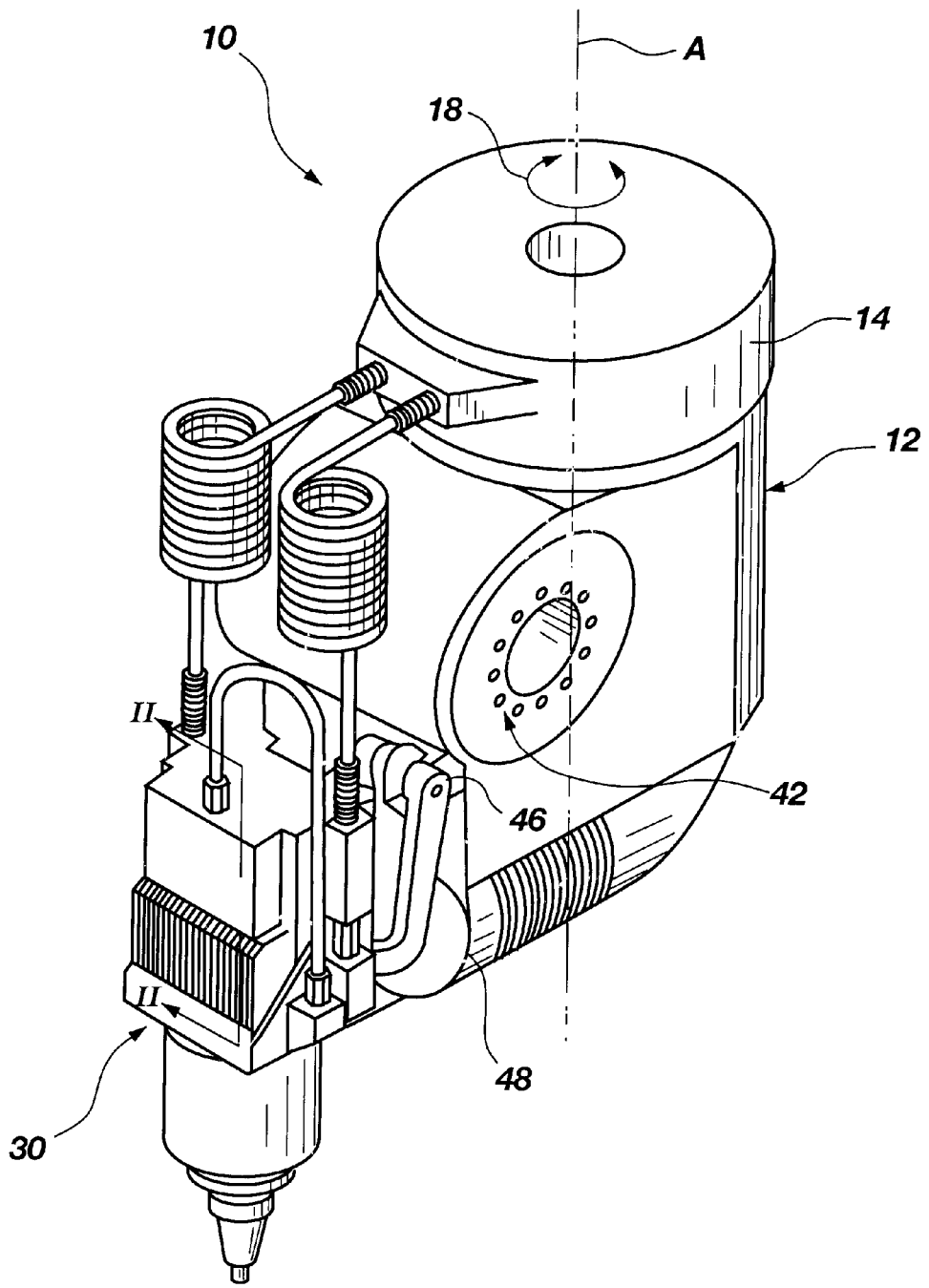
FIG. 1 is a prospective view of an operating head according to this invention.
Figure 2:
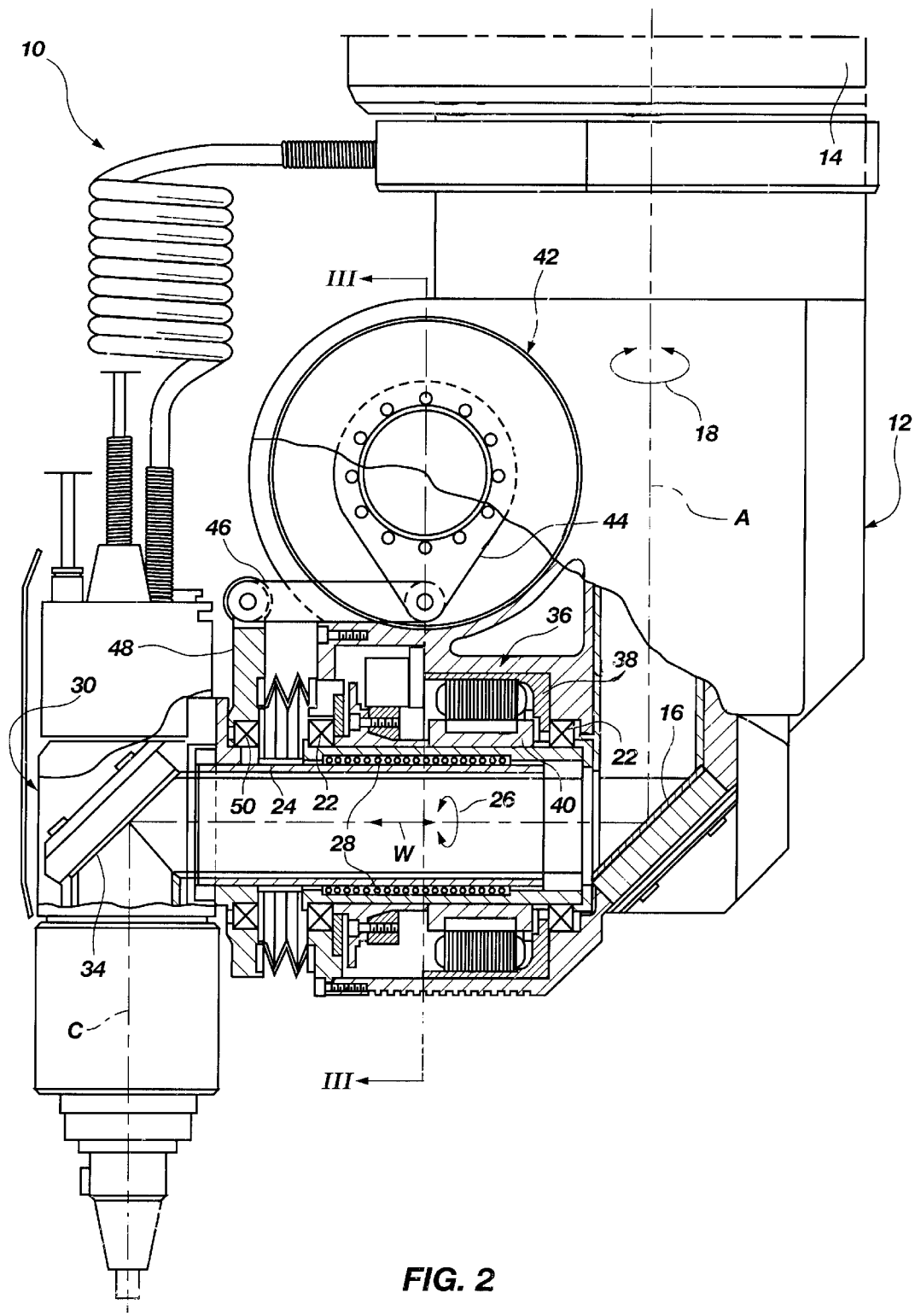
FIG. 2 is a partial section according to the line II—II in FIG. 1.

With reference to the drawings, number 10 indicates an operating head for laser machine. The head 10 comprises a base 12 which anchoring section 14 (FIG. 1) is destined to be fastened to the terminal part of a mobile body (not illustrated) of a laser machine. With reference to FIG. 2, the base 12 carries a first mirror 16 which in use receives a laser beam along a first axis A and deflects it by 90% along a second axis B. Preferably, the base 12 turns around axis A as shown by the double arrow 18 in FIGS. 1 and 2.

Figure 3:
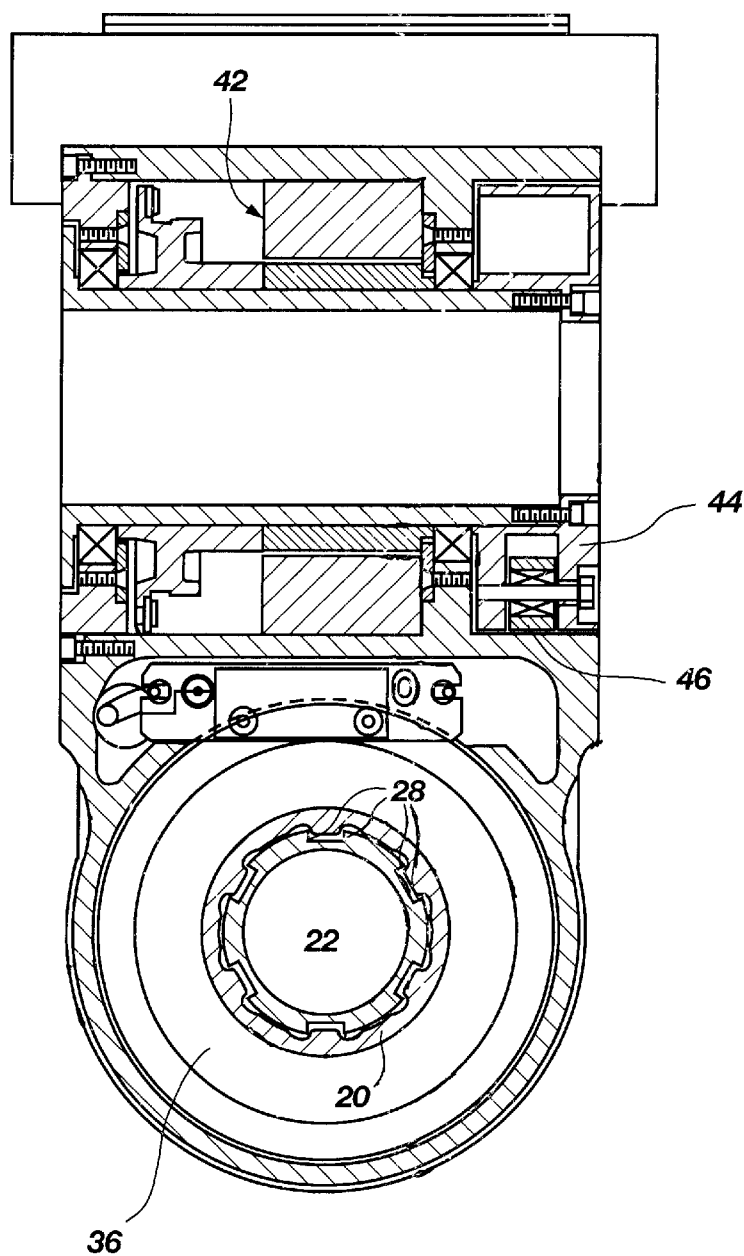
FIG. 3 is a section according to the line III—III in FIG. 2.

With reference to FIG. 2, the head 10 comprises a rotary body 20 which is fitted on the base 12 so that it can turn on axis B by means of a pair of bearings 22. In the form of embodiment illustrated as a non-limiting example in the figures, the rotary body 20 is formed by a tubular element arranged co-axially to axis B. A second tubular element 24 is arranged inside the rotary body 20. The second tubular element 24 is connected to the rotary body 20 by means of a linear prismatic guide to permit the second tubular element 24 movement in the direction of axis B and which rigidly connected to the tubular elements 20, 24 for rotary movements around axis B in the direction shown by the double arrow 26 in FIG. 2. In the example shown in the figures, the linear prismatic guide consists of prismatic ball sleeve indicated by number 28 in the FIGS. 2 and 3.

A terminal body 30 is fastened to the second tubular element 24 and is mobile with respect to the latter in the direction shown by the double arrow 32 in FIG. 2. The terminal body 30 carries a second mirror 34 which receives the laser beam along axis B and deflects it by 90° in the direction of the third axis C.

With reference to FIG. 2, a first direct motor 36 has a stator 38 fastened the body 12 and a rotor 40 fastened to the rotary body 20. The motor 36 controls the rotation of the terminal body 30 around the axis B without the need of a reducing mechanism. Direct motors, of the type known, allow work on very small angles (in the range of $10^{-3}$°), with wide torque and resolution, with a 1:1 transmission ratio referred to the mobile unit connected to it and without reducers or kinematic units (belts, pulleys, etc.).

A second direct motor 42 controls the movement of the terminal body 30 in the direction indicated by the double arrow W. The second direct motor is fitted on the base 12 and comprises a wheel 44 connected solidly to the rotor of the motor 42. The wheel 44 is jointed to a connecting rod 46 which is in turn jointed to a flange 48. The flange 48 is connected to the terminal body 30 by means of a bearing 50 which is co-axial to axis B. In the form of embodiment illustrated in the figures, the direct motors 36 and 42 are constructively identical but are oriented in different fashions. More precisely, while the first direct motor 36 is arranged with its axis co-axial to axis B, the second direct motor 42 is arranged with its axis perpendicular to axis B and distanced from the latter. The rotary movement of the second motor 42 is transformed into linear movement by a mechanism which comprises the wheel 44 and the connecting rod 46. The bearing 50 connects the terminal body 30 to the motor 42 for the movements in direction W but leaves the terminal body 30 free to turn on axis B with respect to the flange 48. It is understood that the linear and rotary movements of the terminal body 30 can be combined to move the laser beam output from the head along the axis C along any path contained in a working area which limits are defined by the amplitude of the working strokes of the motors 36 and 42.

The direct rotary motor 42 can be replaced by a direct motor of the linear type, which mobile part is directly connected to the flange 48.

The motors 36 and 42 are fitted on the base 12. Consequently, the inertia of the mobile bodies is lowered, which improves rapidity of movement of the terminal body 30. Furthermore, the direct motors permit elimination of kinematic chain play and to reduce the number of components of the head 10. Moreover, the arrangement of the motors on the base 12 permits simplification of electrical wiring.

Preferably, the entire head 10 is fitted so to turn on axis A, this rotation also being controlled by a direct motor (not illustrated) which co-operates with the flange 14.

What is claimed is:

1. An operating head, specifically for a laser machine, comprising:
    a base;
    a rotary body fitted on said base configured to turn on an axis;

a terminal body mobile with respect to said rotary body in the direction of said axis;

a first motor for controlling the movement of said rotary body on said axis; and a second motor for controlling the movement of said terminal body on said axis, wherein either said first motor or said second motor is a direct motor and said first motor and said second motor are connected to said base.

2. An operating head, specifically for a laser machine, comprising:

a base;

a rotary body fitted on said base configured to turn on an axis;

a terminal body mobile with respect to said rotary body in the direction of said axis;

a first motor for controlling the movement of said rotary body on said axis, wherein said first motor is arranged co-axially with said rotary body; and a second motor for controlling the movement of said terminal body on said axis, wherein either said first or said second motor is a direct motor.

3. An operating head, specifically for a laser machine, comprising:

a base;

a rotary body fitted on said base configured to turn on an axis;

a terminal body mobile with respect to said rotary body in the direction of said axis;

a first motor for controlling the movement of said rotary body on said axis; and a second motor for controlling the movement of said terminal body on said axis, wherein either said first motor or said second motor is a direct motor;

wherein said second motor is a rotary motor arranged with its axis of rotation perpendicular to and distanced from said axis, and said second motor is connected to said terminal body by a mechanism for converting the rotary movement into linear movement.

4. An operating head, specifically for a laser machine, comprising:

a base;

a rotary body fitted on said base configured to turn on an axis;

a terminal body mobile with respect to said rotary body in the direction of said axis;

a first motor for controlling the movement of said rotary body on said axis, wherein said first motor is a direct motor; and a second motor for controlling the movement of said terminal body on said axis, wherein said second motor is either a direct or a linear motor.

5. An operating head, specifically for a laser machine, comprising:

a base;

a rotary body fitted on said base configured to turn on an axis, said rotary body comprising a first tubular element carrying a second tubular element, said second tubular element being connected to said first tubular element by a linear prismatic guide arranged in parallel to said axis;

a terminal body mobile with respect to said rotary body in the direction of said axis, wherein said second tubular element is configured to be fastened to said terminal body;

a first motor for controlling the movement of said rotary body on said axis; and a second motor for controlling the movement of said terminal body on said axis, wherein either said first motor or said second motor is a direct motor.

6. An operating head, specifically for a laser machine, comprising:

a base;

a rotary body fitted on said base configured to turn on an axis;

a terminal body mobile with respect to said rotary body in the direction of said axis;

a first motor for controlling the movement of said rotary body on said axis; and a second motor for controlling the movement of said terminal body on said axis, wherein either said first motor or said second motor is a direct motor and wherein further said terminal body is connected to said second motor by a bearing that disengages said terminal body from said second motor for movements around said axis.

* * * * *